(12) United States Patent
Readler

(10) Patent No.: US 7,755,470 B2
(45) Date of Patent: Jul. 13, 2010

(54) SECURITY TELEVISION SIMULATOR

(76) Inventor: Blaine Clifford Readler, 11320 Florindo Rd., San Diego, CA (US) 92127

( * ) Notice: Subject to any disclaimer, the term of this patent is extended or adjusted under 35 U.S.C. 154(b) by 741 days.

(21) Appl. No.: 11/701,659

(22) Filed: Feb. 5, 2007

(65) Prior Publication Data

US 2008/0186256 A1    Aug. 7, 2008

(51) Int. Cl.
G08B 1/00 (2006.01)
G08B 13/00 (2006.01)
G08B 3/00 (2006.01)
G08B 5/22 (2006.01)
G09G 3/06 (2006.01)

(52) U.S. Cl. .............................. 340/309.16; 340/815.45; 340/541; 340/691.2; 340/691.6; 345/44; 345/45; 345/46

(58) Field of Classification Search ............ 340/309.16, 340/541, 815.45, 691.2, 691.6; 345/44–46
See application file for complete search history.

(56) References Cited

U.S. PATENT DOCUMENTS

| | | |
|---|---|---|
| 4,970,489 A | 11/1990 | Jenkins |
| 5,032,766 A | 7/1991 | Gundlach |
| 5,252,947 A | 10/1993 | Marciano |
| 5,442,524 A | 8/1995 | Farmer |
| 7,365,649 B2 | 4/2008 | Weitzel |

FOREIGN PATENT DOCUMENTS

| | | |
|---|---|---|
| DE | 4343708 A1 | 12/1993 |
| GB | 2318461 A | 4/1998 |
| GB | 2398862 A | 9/2004 |
| GB | 2443898 A | 5/2008 |

*Primary Examiner*—Benjamin C Lee
*Assistant Examiner*—Lam P Pham

(57) ABSTRACT

Method and apparatus for simulating an operating television for the purpose of deterring potential intruders by providing the appearance that one or more occupants are at home. Realistic simulation of a television is accomplished via perceived random combinations, amplitudes, colors, and durations of television program scene modes, these scene modes comprised of fades, swells, flicks, and static periods. Efficient, reliable, and inexpensive super-bright LEDs serve as light sources.

17 Claims, 5 Drawing Sheets

SECURITY TELEVISION SIMULATOR

CROSS-REFERENCE TO RELATED APPLICATIONS

Not Applicable.

SEQUENCE LISTING

Not Applicable

BACKGROUND

1. Field of Invention

This invention relates to security devices, and specifically to security devices that mislead potential intruders into thinking that there are occupants at home.

2. Description of Prior Art

Home security is an ongoing concern for nearly everybody. As long as there are people who have homes containing possessions, there are others who would, provided the opportunity, break into those homes to steal those possessions. Alarm systems are available that attempt detection of intruders and, in response, alert the homeowner, a hired security company, or neighbors. However, as long as the intruder believes he has time where he won't be disturbed, he is often able to disable or circumvent the alarm system. In any case, damage can occur before an alarm is sounded.

A better defense against intruders is to deter them from considering entry in the first place. It has been shown that a dog inside the house can be effective in this regard. Not everybody can nor wants to own a dog, though. Also, it is often not feasible to leave a dog alone during extended trips. And, finally, an unrestrained, un-reprimanded dog barking inside can often have the opposite effect—reassuring the desirous intruder that no one is indeed at home.

A proven means for deterring potential intruders is to convince them that someone is at home. U.S. Pat. No. 4,970,489 describes an occupancy simulator that casts shadows on an interior walls which are meant to resemble people walking to and fro within. This patent suffers the failing that the intended simulation of human presence falls woefully short of actual realism. The device described casts shadows that move steadily across the wall with no apparent animation, as though a statue were being dragged back and forth. Additionally, an observer intuitively understands that distinct shadows are cast on a wall by a single, undiffused light source, and that this type of lighting is extremely rare in a modern home, where room lighting is generally provided by recessed ceiling lights, or by lamps or ceiling lights that include shades which specifically diffuse the light in order to eliminate distinct shadows.

U.S. Pat. No. 5,442,524 describes a different approach to the same ends by casting moving shadows across the inside of a shade or curtain. Although the invention attempts to incorporate a certain degree of randomness to the speed of the parade of shadows, the fact that they always move in one direction, and that their shapes remain fixed and inanimate, leave the result to fall far short of a convincing simulation of human movements. Additionally, although the rate of rotation of the generating mechanism is not constant, the shadow patterns still repeat every few minutes, thus betraying the artificial source.

Although it is common to leave lights and even a radio on inside, there are few better indications of occupancy than the distinctive flickering, subtly changing light from an operating television. Some people do indeed leave a visible television on while out for an evening, but this is rarely considered practical for extended absences. Additionally, the televisions may be located in inner rooms where they would not have visible indications from outside.

U.S. Pat. No. 5,252,947 describes a home security device for simulating a television, however, this method lacks substantial ability to convincingly mimic a modern television for multiple reasons. Firstly, the invention describes a flasher for varying the brightness of a light source. These flasher devices enable electricity to flow in an interrupted, semi-regular fashion that, when used with the light source, produce a slow-rhythm strobing effect that might simulate a scene filmed in a discotheque, but is far removed from what is encountered on any normal television broadcast. Even if the flasher device were somehow made to switch on and off in a random manner, this still would not fairly simulate an actual television in operation since a typical television image consists of complex patterns as scenes fade, swell, abruptly change, or slowly transition as the camera pans, resulting in images that thusly fade, swell, flick, and remain nearly steady for varying periods of time.

Secondly, the patent describes a blue light, which is appropriate for a black-and-white television, whereas virtually all modern televisions for home use are color.

Finally, the patent describes an incandescent bulb which is wasteful of energy and could burn out when operated over extended periods of absence.

As is demonstrated in the failings of all of the just-described patents, humans and their activities exhibit both a subtly and a sophistication that is not readily imitated by regular, repetitive actions, whether a flashing light intended to imitate an operating television, or carousel-type shadows moving back and forth across a wall or window covering.

Advantageous would be a device that accurately simulates an operating television that could be easily positioned anywhere in the home.

SUMMARY OF THE INVENTION

Therefore, in accordance with the present invention, a method for accurately simulating a television image uses intensity fades, swells, flicks, steady periods, and varying realistic colors through a long-lasting and energy-efficient LED light source. Since the LED light source is extremely low-powered, the simulating device can be housed in a small, portable enclosure, and can operate either from household electricity, or from batteries.

Objects and Advantages

Accordingly, several objects and advantages of the present invention are:

a) to provide a method for simulating a television image that is realistic, b) to provide such a television simulator that is inexpensive, c) to provide a television simulator that is reliable, d) to provide a television simulator that is energy-efficient, e) to provide a television simulator that is easy to use, f) to provide a television simulator that can operate either from household electricity, or from batteries.

DETAILED DESCRIPTION OF THE INVENTION

When viewed directly, a television screen depicts the camera's view of an image, but viewed indirectly, as, for example, when illuminating a window shade, the details of the image meld together so as to form a virtual single light source, whose color and intensity comprises the average of all the collective pixels of the television screen. Using a light source of varying color and intensity, the invention simulates an operating television as it would appear shining on a translucent surface, such as window shades or curtains, or reflected off obliquely positioned surfaces, such as window blinds.

It is well understood in optical design that all the perceived colors of the spectrum can be created by combining, in different proportional intensities, three primary light sources: red, green, and blue. By varying the individual intensities of three light sources of these primary colors, the invention creates a great variety of colors, simulating the complex mix of colors that meld in the ever-changing television programs. The preferred embodiment described here uses, as the primary color light sources, efficient super-bright LEDs. Some advantages of these over traditional light sources, such as incandescent bulbs, are that they are highly efficient—using ⅕₀th as much power as incandescent bulbs for the same lumens of beamed light—and, long lasting—at least 50 times the life of an average 60 Watt light bulb.

Although there appears, in the melded, combined light of a television program, an element of randomness, the actual effect is far more subtle than simple random changes in intensity and color. Television programs consist of a mix of continuous, sometimes rapid-fire, scene changes, and longer static scenes accompanied by occasional camera fades and swells. Therefore, in order to accurately simulate an operating television's melded image, the invention uses digital logic to pseudo-randomly generate color-coordinated scene changes, varying length static periods, and scene fades and swells.

Figure 1:
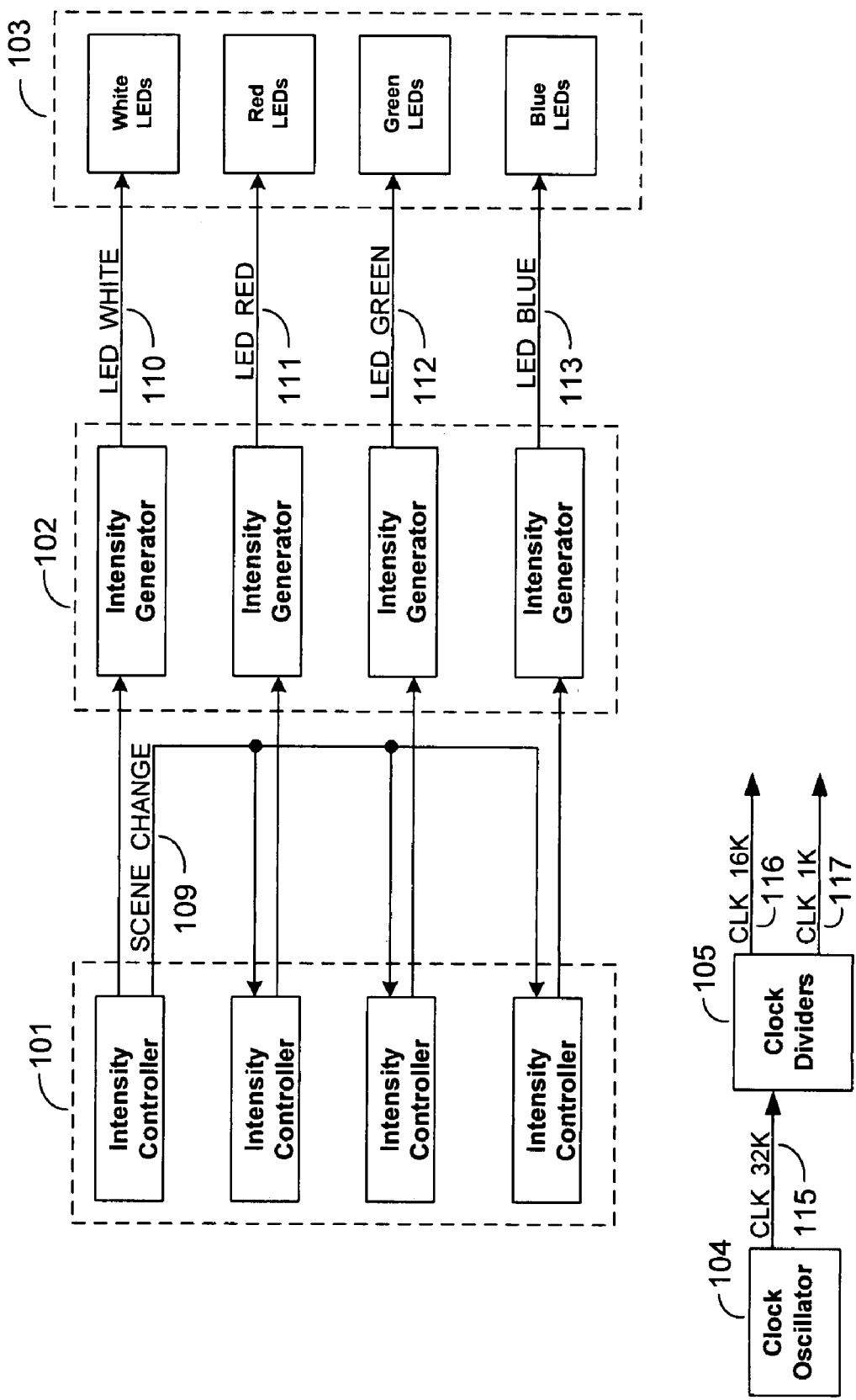
FIG. 1 is a block diagram of a television simulator according to the present invention.

Television Simulator Block Operation, FIG. 1

FIG. 1 shows a block view of the operation of the invention. Blocks 103 show the super-bright LED light sources. Although, as has already been explained, a large variety of perceived colors can be created using the three primary red, green, and blue colors, a large proportion of light in our everyday world, and, consequently, the images displayed on television programs, is white, or varying degrees of grayscale. Therefore, a more efficient and effective effect is achieved by supplementing the color generation with a direct white component. Note that different embodiments may contain any number of LEDs operating in parallel, as will be explained later.

Blocks 101 comprise the Intensity Controllers, one for each color. This function creates characteristically changing intensity levels as communicated by a binary digital number. The Intensity Controller block 101 associated with the white LED serves as the master, and coordinates simultaneous scene changes across all colors via signal SCENE_CHANGE 109.

Whereas block 101 creates the binary digital information associated with intensity levels, block 102 translates this intensity information into average electrical currents which, when converted to light via super-bright LEDs 103, produce the perceived melded television image.

Clock oscillator 104 is a common, readily available 32.768 KHz oscillator which generates free-running digital clock signal CLK_32K 115, which in turn is divided down by Clock Dividers 105 to create the basic digital clocks CLK_16K 116 and CLK_1K 117, which drive the remaining digital circuitry. Clock signal CLK_16K is created via a modulo 2 counter which is clocked by signal CLK_32K, and has a periodic frequency of approximately 16 KHz. Clock signal CLK_1K is created via a modulo 16 counter which is clocked by signal CLK_16K, and has a periodic frequency of approximately 1 KHz.

Figure 2:
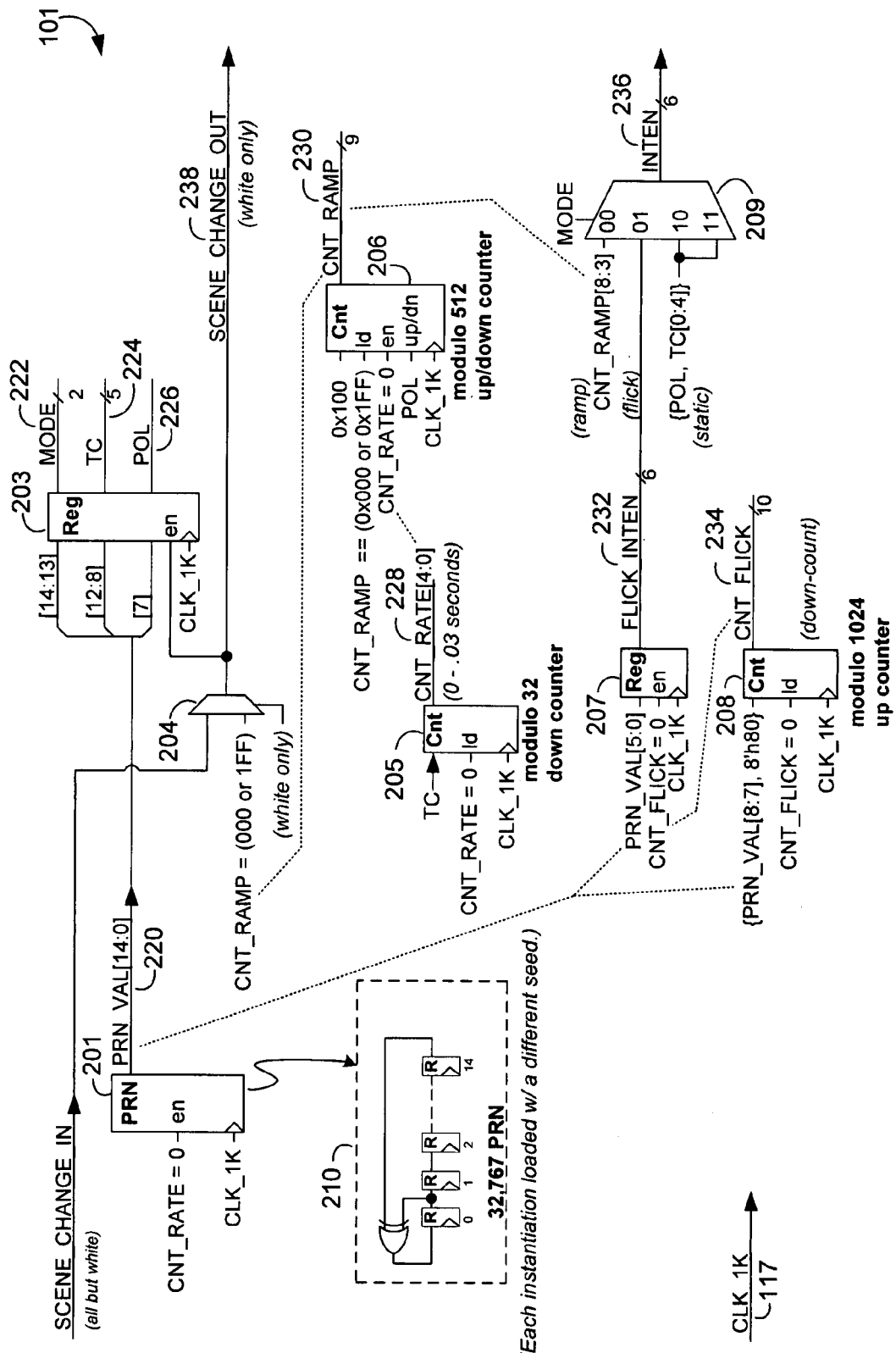
FIG. 2 shows a functional diagram of the Intensity Controller block of FIG. 1.

Intensity Controller, FIG. 2

FIG. 2 shows a block view of the operation of the Intensity Controller 101 already introduced in FIG. 1. As will be seen, Intensity Controller 101 serves to generate a six-bit binary INTEN value 236 whose magnitude, when converted to a corresponding light source intensity, mimics the melded light of a television. The overall operation of Intensity Controller 101 is controlled by three binary values stored in holding register 203: MODE signal 222, which determines the current basic type of operation, TC signal 224, which determines how long the current type of operation will last, and POL signal 226, which, when selected for a ramp type of operation (as established by MODE), determines whether the ramp is swelling, i.e., increasing in brightness, or fading, i.e., decreasing in brightness.

As was seen in FIG. 1, Intensity Controller 101 operates in two configured versions, depending on whether it is associated with the white LED, or the other colors. Each version will be described separately.

White LED Version:

Pseudo-random generator 201 provides an element of apparent randomness to some aspects of the operation, although the INTEN output is not itself varying in a random, or pseudo-random fashion. Dashed box 210 shows the operation of the Linear Feedback Shift Register (LSFR) 32,767-value pseudo-random generator, which is not described further since this form is well known in the art.

Pseudo-random generator 201 operates in concert with holding register 203, modulo 32 rate count down-counter 205, and modulo 512 ramp count up/down-counter 206 to update holding register 203 in a non-regular fashion with control parameters that vary with each update.

In order to understand this coordinated operation, first assume that holding register 203 has just been updated with new MODE, TC, and POL values. Note that rate count down-counter 205 operates in a cyclical manner, continually decrementing until it reaches zero, at which point value TC is loaded, whereby it begins decrementing again from there. Therefore, a new TC value establishes a new cyclical period for rate count down-counter 205. In turn, each time rate count down-counter 205 completes a cycle, as defined by its output CNT_RATE 228 reaching zero, both pseudo-random generator 201 and ramp count up/down-counter 206 are enabled for one clock. Whereas pseudo-random generator 201 steps forward to is next pseudo-random value, ramp count up/down-counter 206 either increments or decrements by one, as directed by holding value POL. Rate count down-counter 205 continues cycling, incrementing or decrementing ramp count up/down-counter 206 with each pass, until ramp count up/down-counter 206 reaches its minimum value (hex 0x000), or maximum value (hex 0x1FF). At this point, ramp count up/down-counter 206 is loaded with its midpoint value (hex 0x100) and holding register 203 is loaded with new values from pseudo-random generator 201, and the process begins again. In this way, it is seen that holding register 203 is loaded with new MODE, TC, and POL values at varying periods of time, and that the output of ramp count up/down-counter 206, CNT_RAMP 230, comprises a ramping value, either up or down, whose length also varies with each cycle.

Attention is now turned back to Intensity Controller output INTEN 236. Multiplexer 209 determines from which source INTEN is produced, as selected by MODE. When MODE is binary value 00, INTEN comprises the most significant bits of CNT_RAMP, and, therefore, in this mode, INTEN is a continually decreasing or increasing ramp value. This corresponds to the camera fade and swell functions previously described. When MODE is either binary value 10 or 11, INTEN comprises a value that is a combination of holding register 203 bits, and, therefore, INTEN is constant for the duration of this mode. This corresponds to the static function previously described. Note that the bit order of the TC portion of the INTEN source in this mode is reversed in order to avoid any obvious correlation between the INTEN magnitude and the mode's duration, which, as has already been described, is determined by TC. The final MODE value, binary 01, comprises the flick function previously described, and will now be explained.

Modulo 1024 flick count down-counter 208 cycles continuously, but, each time it reaches zero, it is loaded with a value whose MS two bits comprise two bits of PRN_VAL. Since PRN generator 201 is enabled more often than flick count down-counter 208 is re-loaded, flick count down-counter 208's cycle period is continually changing. Each time flick count down-counter 208's output CNT_FLICK 234 reaches zero, flick intensity register 207 is enabled, and the six LS bits from PRN generator 201 are latched as FLICK_INTEN 232. Thus, at varying periods, varying values are latched as flick intensity register 207 output FLICK_INTEN, which comprises the flick input of Multiplexer 209, and comprises the INTEN 236 module output for flick modes.

Therefore, it can be seen that INTEN output consists of three modes in varying occurrences, where each change of mode corresponds to a simulated change of television program scene:

a ramp function, CNT_RAMP 230, emulating either camera fades with linearly decreasing values, or camera swells with linearly increasing values, where the rate of progression and length of fade or swell varies, a flick function, FLICK_INTEN 232, emulating quick changes of camera perspective via varying magnitudes of values, each occurring for varying amounts of time, and a static function, emulating a steady camera scene, where the value is constant for an entire mode period.

Note that the static mode, selected from two of the four inputs of multiplexer 209, is twice as likely to occur as either the ramp or flick modes, reflecting the more likely occurrence of steady camera scenes in television programs.

An important aspect of accurately emulating a television image is the time factors associated with the operation. This will now be described. All counters in Intensity Controller 101 are clocked by 1 kHz clock CLK_1K 117. Since counter 205's load values vary from 0 to 31, it's cycle times will correspondingly vary between zero and 32 milliseconds. Further, since each cycle of counter 205 corresponds to one increment or decrement of counter 206, and since counter 206's range is 256 (i.e., hex 0x100), the duration of a ramp cycle will be in the range of 0 to 8.2 seconds. Since CNT_RAMP also determines when MODE is updated in register 203, the duration of each mode period is also in the range of 0 to 8.2 seconds. Since counter 208's load values vary from 128 (hex 0x080 when PRN_VAL[8:7] is 00) to 896 (hex 0x380 when PRN_VAL[8:7] is 11), the duration of a flick period is in the range of 0.128 to 0.896 seconds.

The previous description has been relevant for the Intensity Controller associated with white LEDs. As will be explained, this version serves as the master Intensity Controller, dictating scene changes for the other Intensity Controllers associated with the colored LEDs. As has been seen, the end of each mode, i.e., scene period, occurs when CNT_RAMP reaches its terminal values, and this event is provided out of the module as signal SCENE_CHANGE_OUT 238, which is only used for the Intensity Controller block associated with white LEDs.

Colored LED Version:

For Intensity Controllers associated with colored LEDs, holding register 203 is not latched by CNT_RAMP reaching a terminal value, but, rather, via the SCENE_CHANGE_IN input signal. This input signal is sourced by the white LED's Intensity Controller's SCENE_CHANGE_OUT signal via the SCENE_CHANGE signal shown previously in FIG. 1. Thus, the master Intensity Controller block associated with the white LEDs provides coordinated scene changes for all LEDs. In this way, predominant changes in overall color are substantially associated with changes in scene, as occurs in typical television programs.

As is well understood in the art, LSFR pseudo-random generators can be started with different seeds, i.e., starting values in the component shift register, and the seeds associated with the pseudo-random generators of each Intensity Controller block, are different. In this way, the sequences of operation of the various Intensity Controller blocks will proceed differently, as is desired to afford the greatest variety of simulated scene complexities. The actual values of the seeds are inconsequential since any difference between the seeds results in substantial differences between the resulting pseudo-random generator values at any time.

Figure 3:
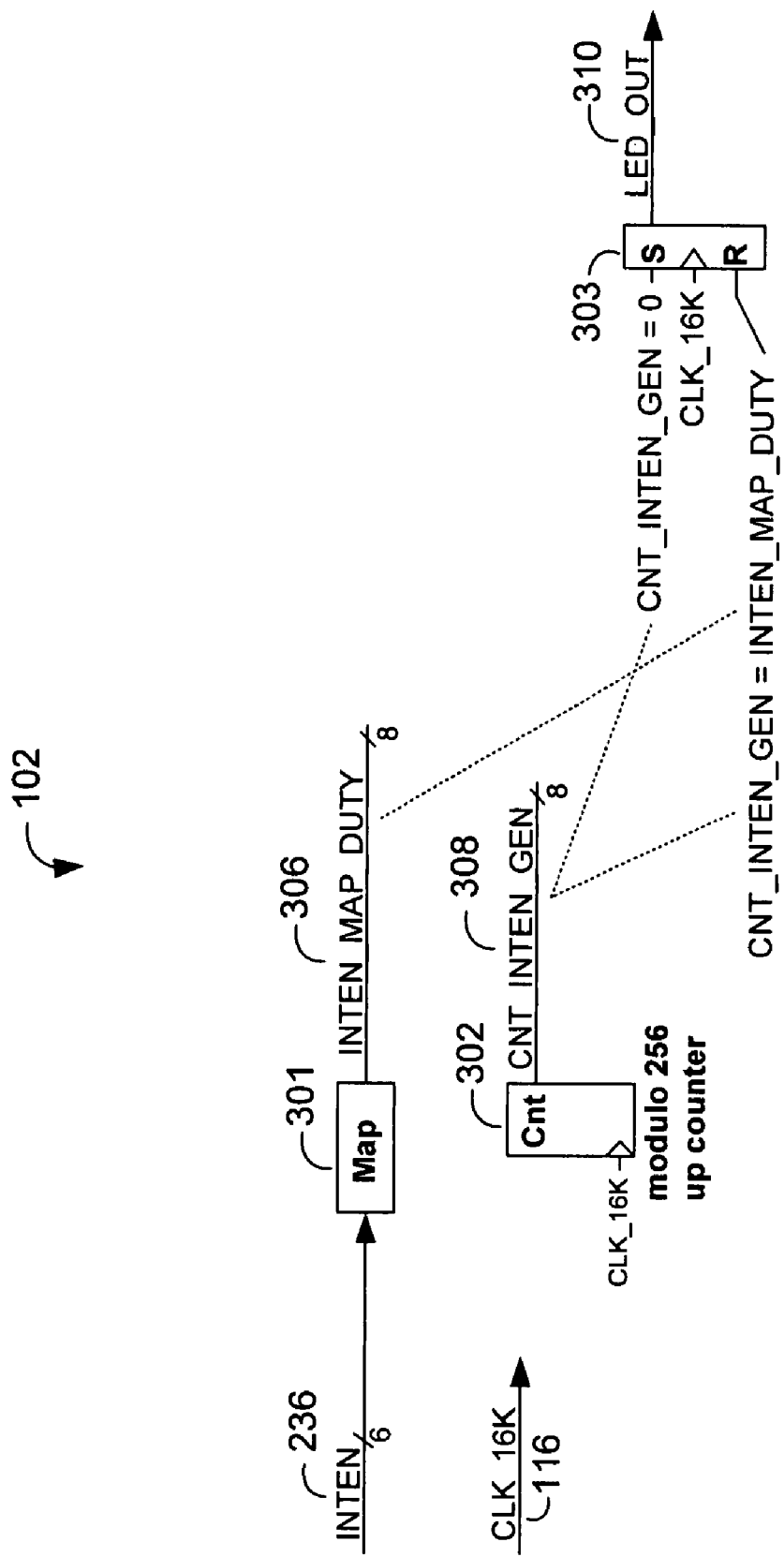
FIG. 3 shows a functional diagram of the Intensity Generator block of FIG. 1.

Intensity Generator, FIG. 3

Whereas the Intensity Controller block just described creates binary word INTEN whose amplitude varies according to simulated television program scene modes, the Intensity Generator block 102 shown in FIG. 3 translates these binary words into a signal appropriate for controlling an LED's intensity.

It is well understood in photometry that perceived brightness is closely proportional to luminance, or emitted power. Further, since the power emitted by the LEDs is closely proportional to the power dissipated by the current passed through it, and since power is related to the square of the current, the perceived brightness of the LEDs is closely proportional to the square of the current passed through the LEDs. I.e., given a certain amount of current, and an associated amount of resulting brightness, a doubling of brightness requires a quadrupling of current.

Figure 4:
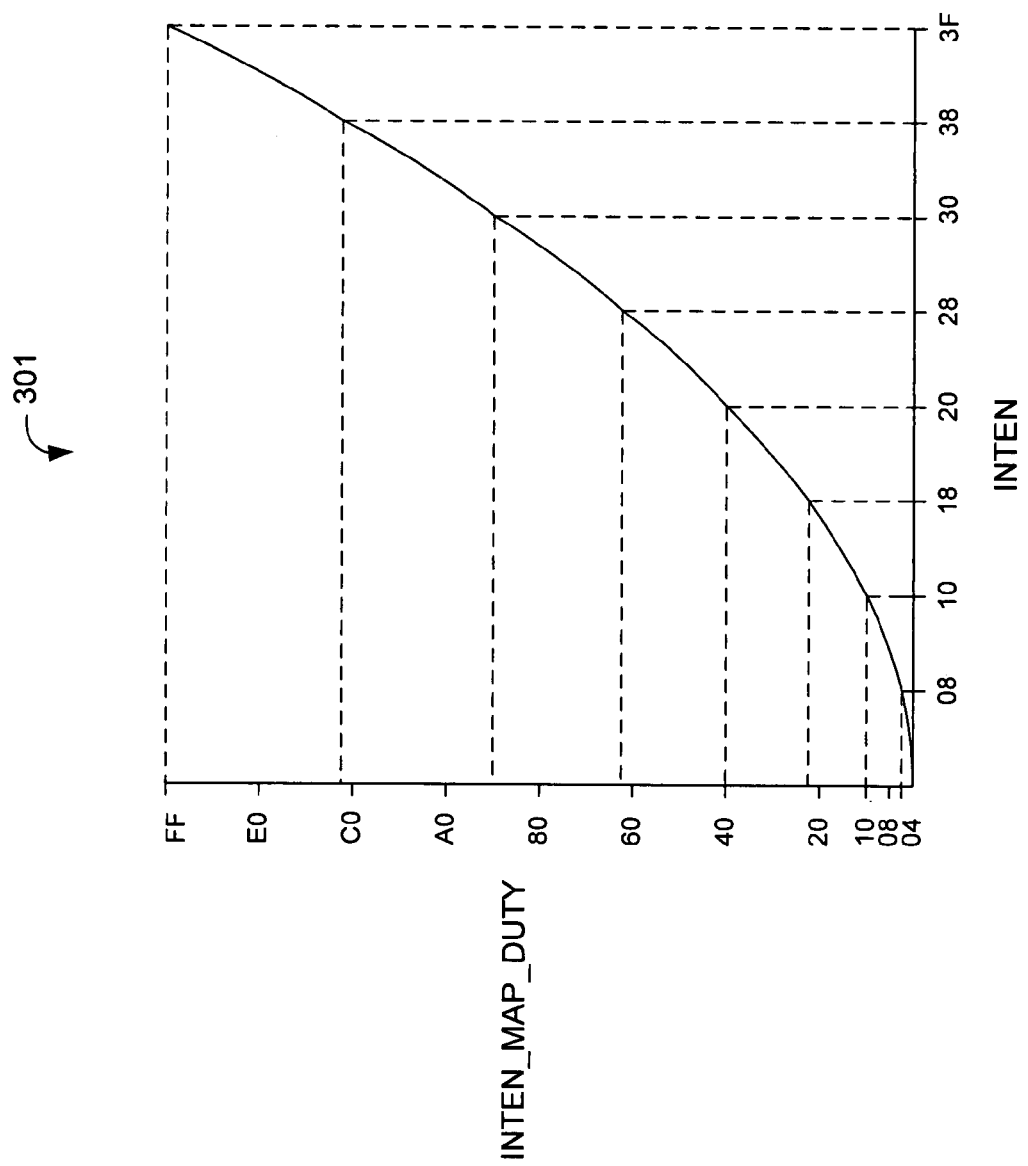
FIG. 4 illustrates a translation graph for the Map function of FIG. 3.

Thus, a direct translation of INTEN value to LED current would result in perceived brightness that would not seem proportional to the changing values of INTEN, but, rather, would seem biased towards the maximum brightness. Therefore, the preferred embodiment maps INTEN values in Map function 301 into INTEN_MAP_DUTY 306 values via a squaring function, whereby increases in INTEN values result in increases in INTEN_MAP_DUTY that are a square of the amount of INTEN increase. FIG. 4 illustrates the map relationship between INTEN and INTEN_MAP_DUTY performed by Map function 301.

One possible mechanism for converting the mapped INTEN_MAP_DUTY binary word into a proportional current for driving the LEDs would be to use a digital-to-analog converter device. However, the preferred embodiment uses a more economical method, whereby, instead of varying the steady amplitude of current driven through the LEDs, a similar result is achieved by pulsing a fixed amplitude of current, and varying the pulse's duty cyle, where the duty cycle is proportional to the digital value of INTEN_MAP_DUTY. Modulo 256 counter 302 continually increments, reaching it's maximum 256 value and returning to zero every 256 clocks. Each time counter 302's output CNT_INTEN_GEN 308 returns to zero, set/reset latch 303 is set, and the LED_OUT signal 310 is at a one (high) state. As counter 302 then increments again, latch 303 is reset, and LED_OUT signal is at a zero (low) state, when counter 302's value equals INTEN_MAP_DUTY. In this way, output signal LED_OUT comprises repeating periods of high states whose duration is proportional to INTEN_MAP_DUTY. Since CNT_INTEN_GEN cycles every 256 clocks, and the clock rate of CLK_16K 116 is 16 KHz, the repetition rate of the varying pulses is 62.5 Hz, well above the 30 Hz rate where the human brain begins to perceive a flicker.

Figure 5:
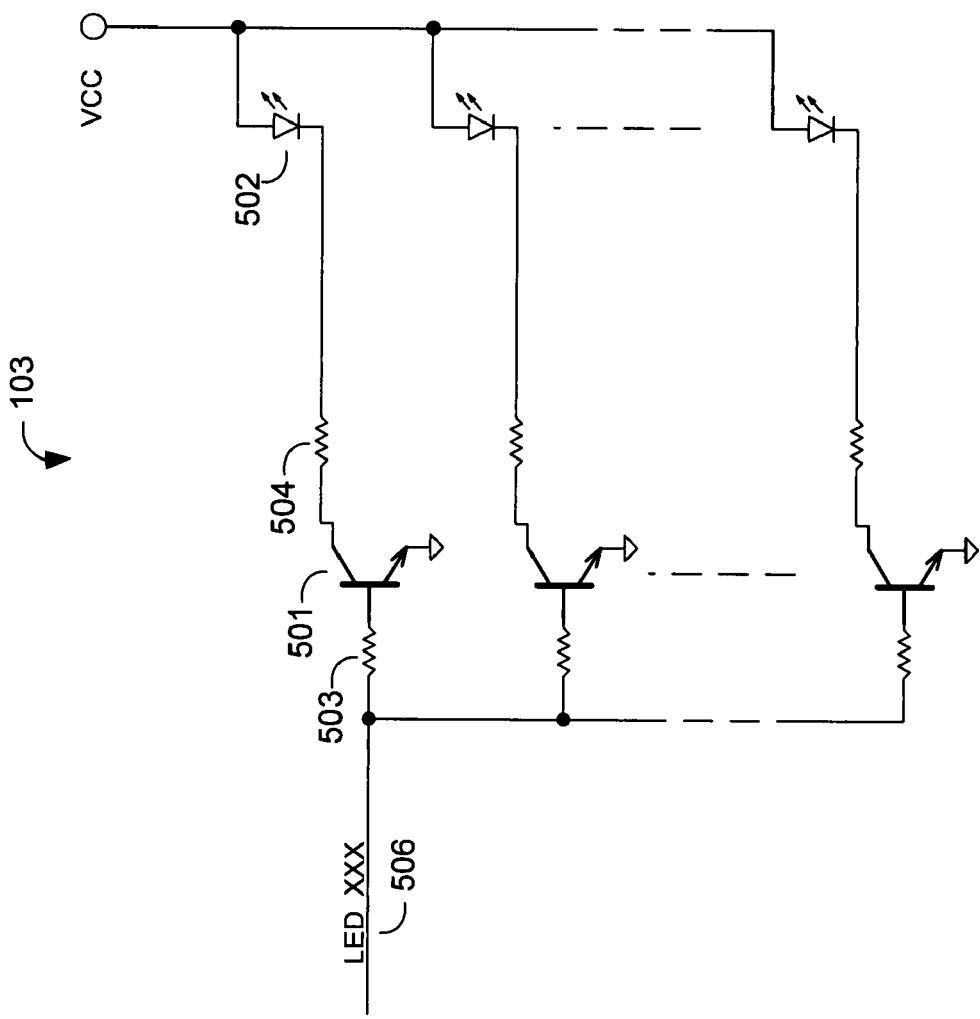
FIG. 5 shows a schematic diagram of the LED block of FIG. 1.

LEDs, FIG. 5

The preferred embodiment implements the previously discussed logic functions in an FPGA device, specifically, a Xilinx Corporation XC3S100E Spartan FPGA. Although it is possible to drive an LED directly from an FPGA device, the preferred embodiment uses external transistors to enable the LED current in order to both provide a more consistent quantity of current during the on state, and also to allow multiple, parallel LEDs to be used. Implementation of these external resistors in the preferred embodiment are shown in FIG. 5. Here, multiple, transistor/LED combinations are shown, and only one pair is described since the rest operate in an identical manner. Transistor 501 serves as a switch, either turned off, withholding current to its associated LED 502 so that no light is emitted when control signal LED_XXX 506 is low, or turned on, allowing current to flow through the LED so that light is emitted when control signal LED_XXX is high. Resistor 503 limits the current flowing into transistor 501's base terminal, and is sized so the transistor is saturated when control signal LED_XXX is high, but not so low in resistance as to cause damage to the transistor. Resistor 504 limits the current flowing through both LED 502 and transistor 501's collector, and is sized such that the LED is adequately activated, but not so low in resistance as to cause damage to either the transistor or the LED. Similar sets of transistor/LED serve each color of the preferred embodiment. For the white color, control signal LED_XXX is connected to signal LED_WHITE 110 shown in FIG. 1, while for the red color, control signal LED_XXX is connected to signal LED_RED 111, for the green color, control signal LED_XXX is connected to signal LED_GREEN 112, and for the blue color, control signal LED_XXX is connected to signal LED_BLUE 113.

Packaging, Powering, and Operation

The size of the device's enclosure is substantially determined by the quantity of LEDs implemented, since the FPGA component is small compared to the space required for the LEDs and associated transistors. The preferred embodiment, for example, uses five white LEDs, and one each of the other three colors, for a total of eight LEDs, with room for three size AA batteries. A frosted cover diffuses the LED's beamed light somewhat, producing an even mix of colors across an approximate 5-foot radius, e.g., an area sufficient to cover most home windows.

The preferred embodiment is powered either off of the internal batteries just described, or an external AC wall adapter, such as LTE's GFP101U-0515.

In operation, the device is placed such that the diffused beam shines on a window's shade, partially closed blinds, or other covering, so as to be illuminated as seen from the outside. As with an actual television in operation, this is predominantly visible after dark.

Note that, as used in the preferred embodiment, the fifteen-bit pseudo-random generator provides over twenty-four hours of operation of the device before the processes repeat. This is, of course, many times longer than any person could reasonably expect to detect.

CONCLUSION, RAMIFICATIONS, AND SCOPE

Accordingly, the reader will see that due to the sophistication of the simulated scene fades, swells, flicks, and static periods, the invention provides a realistic simulation of an operating television. The use of LEDs as a light source provides for a device that is reliable and energy-efficient, and this in combination with a small size and integrated control circuitry afford a very economical manufacturing cost. As a consequence of the efficiency of LEDs, the invention can operate from household electricity, or from batteries, and, since there is no programming or setup required, the device is extremely easy to use.

Although the preferred embodiment describes certain specific methods for producing the characteristically varying emitted light to simulate the melded light of television programs, it will be obvious to one practiced in the art that similar techniques as those described could be applied. For example, although the preferred embodiment uses an FPGA to implement the logic functions that produce static, flick, and ramp effects, it will be understood by one skilled in the art that similar implementations can be achieved using a microprocessor. Also, whereas the preferred embodiment uses a logically-derived pseudo-random generator, alternatives such as inherently complex signal sources, e.g., radio noise, or truly random generators could be used for providing the various non-regular sequences and values of the invention's operation.

I claim:

1. An intruder deterrent device that simulates an operating television by projecting light of varying amplitude from a light source, said varying amplitude light emulating the melded image of typical television programs wherein,
   (a) said varying amplitude light comprises a succession of television-simulating program scene modes,
   (b) occurrences of program scene mode types within said succession of program scene modes are random in manner,
   c) initial amplitudes of said program scene modes, irrespective of said scene mode types, are random in manner,
   d) durations of said program scene modes, irrespective of said scene mode types, are random in manner,
whereby, when shone upon a translucent or obliquely positioned surface, said varying amplitude light simulates said melded television image, misleading a potential intruder into thinking that occupants are at home.

2. An intruder deterrent television simulator device according to claim 1, wherein: one of said program scene mode types comprises ramps.

3. An intruder deterrent television simulator device according to claim 1, wherein: one of said program scene mode types comprises flicks.

4. An intruder deterrent television simulator device according to claim 1, wherein: one of said program scene mode types comprises static periods.

5. An intruder deterrent television simulator device according to claim 1, wherein: said light source comprises a super-bright LED.

6. An intruder deterrent television simulator device according to claim 1, wherein: said random manner of said television-simulating mode's initial amplitudes is the same as said random manner of said television-simulating mode's durations.

7. An intruder deterrent television simulator device according to claim 1, wherein: said random manner of said television-simulating mode's initial amplitudes is a pseudo-random generator.

8. An intruder deterrent television simulator device according to claim 1, wherein: said random manner of said television-simulating mode's durations is a pseudo-random generator.

9. An intruder deterrent television simulator device according to claim 1, wherein: said television-simulating ramp mode type comprises both swells and fades.

10. An intruder deterrent device that simulates an operating television by projecting light of varying amplitude from a plurality of light sources, said varying amplitude light emulating the melded image of typical television programs wherein,
 (a) said varying amplitude light comprises a succession of television-simulating program scene modes,
 (b) occurrences of program scene mode types within said succession of program scene modes are random in manner,
 c) initial amplitudes of said program scene modes, irrespective of said scene mode types are random in manner,
 d) durations of said program scene modes, irrespective of said scene mode types are random in manner,
whereby, when shone upon a translucent or obliquely positioned surface, said varying amplitude light simulates said melded television image, misleading a potential intruder into thinking that occupants are at home.

11. An intruder deterrent television simulator device according to claim 10, wherein: said light sources comprise super-bright LEDs.

12. An intruder deterrent television simulator device according to claim 10, wherein: said random manner of said television-simulating mode's initial amplitudes is the same as said random manner of said television-simulating mode's durations.

13. An intruder deterrent television simulator device according to claim 10, wherein: said random manner of said television-simulating mode's initial amplitudes is a pseudo-random generator.

14. An intruder deterrent television simulator device according to claim 10, wherein: said random manner of said television-simulating mode's durations is a pseudo-random generator.

15. An intruder deterrent television simulator device according to claim 10, wherein: said television-simulating ramp mode type comprises both swells and fades.

16. An intruder deterrent television simulator device according to claim 10, wherein: said varying amplitude light comprises a combination of distinct colors that, in varying combinations of intensity, create a wider variety of perceived colors.

17. An intruder deterrent television simulator device according to claim 10, wherein: groups of said light sources operates to each produce said television-simulating modes of ramps, flicks, and static periods.

* * * * *